B. E. MEACHAM.
THERMOSTATIC FUEL REGULATING DEVICE FOR GAS OVENS.
APPLICATION FILED NOV. 16, 1914.
1,236,335.
Patented Aug. 7, 1917.
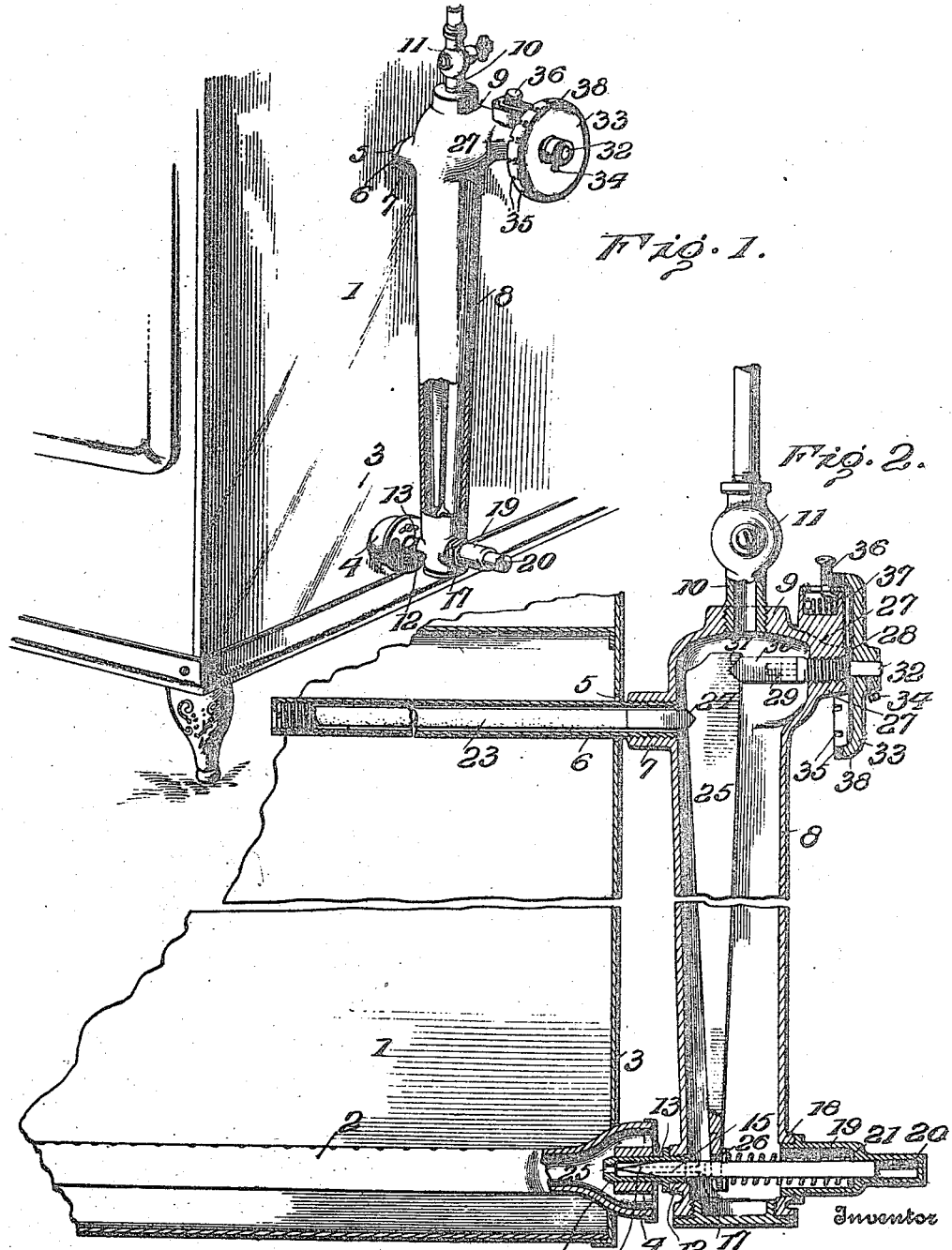

UNITED STATES PATENT OFFICE.

BENJAMIN EDWARD MEACHAM, OF LORAIN, OHIO, ASSIGNOR TO AMERICAN STOVE COMPANY, OF ST. LOUIS, MISSOURI, A CORPORATION OF NEW JERSEY.

THERMOSTATIC FUEL-REGULATING DEVICE FOR GAS-OVENS.

1,236,335. Specification of Letters Patent. Patented Aug. 7, 1917.

Application filed November 16, 1914. Serial No. 872,426.

*To all whom it may concern:*

Be it known that I, BENJAMIN E. MEACHAM, a citizen of the United States, residing at Lorain, in the county of Lorain and State of Ohio, have invented certain new and useful Improvements in Thermostatic Fuel-Regulating Devices for Gas-Ovens, of which the following is a specification, reference being had therein to the accompanying drawing.

My invention relates to improvements in thermostatic fuel regulating devices for gas ovens.

The object of my invention is to provide a fuel regulating device of this character in which the oven can be kept at a predetermined temperature and whereby a more accurate baking of the articles in the oven is obtained.

Another object of my invention is to provide a simple, cheap and effective temperature regulating device of this character which can be readily applied to the ordinary oven now in use without any material change in the oven.

In the accompanying drawings:

Figure 1 is a perspective view of an oven showing my improved thermostatic regulating device applied thereto.

Fig. 2 is a vertical sectional view of the oven taken through the gas supply conduit.

In gas oven it has been found very difficult to maintain the oven at a predetermined temperature for a definite kind of work to be done. Different kinds of baking, roasting and cooking done in the ordinary gas oven requires an experienced operator to keep the oven at the proper temperature owing to the fact that the temperature of an oven is governed by the amount of food stuff placed therein.

It being understood when a small quantity of food stuff to be cooked is placed in the oven, it will require less gas for the burner to maintain the oven at the desired temperature, while when a larger amount of food stuff is to be cooked, it will require a greater amount of gas for the burner to maintain the oven at the desired temperature. When too high a temperature is reached in the oven, the pastry being baked is crusted too quickly and can not rise and become as light as it should when the proper temperature is obtained.

By applicant's improved thermostatic fuel regulator it will be understood that the oven is at all times maintained at the predetermined temperature regardless of the amount of food stuff placed therein, as the heat in the oven entirely governs the gas supply to the burner.

Referring now to the drawings, 1 represents my improved oven, which is provided at its lower end with the usual burner 2 which extends out through the side 3 of the oven and receives the gas and air through the enlarged funnel-shaped portion 4, all of which is understood by those skilled in the art and needs no further description. The side 3 of the oven adjacent its upper end is provided with an opening 5 through which extends the copper tube 6, the outer end of this copper tube 6 is screw-threaded into a nipple 7 carried by the thermostat casing 8 which also serves as the gas supply, as will be hereinafter later described.

The casing 8 at its upper end has an opening 9 into which is screwed the gas supply pipe 10 having the usual valve 11 by means of which the gas can be completely cut off or turned on to the casing 8 when the oven is not in use. The lower end of the casing 8 is provided with an internally screw-threaded boss 12 into which is screwed the nipple 13 which enters the enlarged portion 4 of the burner on the outside of the oven. This nipple 13, as clearly shown, is provided at its outer end with the contracted portion 14 provided with the opening 15 through which the gas is adapted to pass to the burner. Tightly fitting within the central opening of the nipple 13 is a valve 15 which has a pointed outer end 16 adapted to enter the opening 15 for controlling the gas supply to the burner. The valve 15 has longitudinally extending grooves 17 in its sides to allow the gas to pass from the casing 8 to a point adjacent the end of the valve, so that the valve will form a tight joint with the nipple, yet allow a sufficient amount of gas to pass through the valve when it is in the position shown in Fig. 2 of the drawing.

The outer pointed end 16 of the valve 15 is slightly flattened so that the opening 15 of the nipple 13 will not be completely closed when the valve is in its extreme left position. By this construction it will be seen that there will be at all times a small flow of gas to the burner so that the burner is continuously lighted and thus when the oven has cooled off a little and the gas turned on again the burner is in operation and does not require the ordinary pilot light.

When the valve 17 is moved to the left, it closes the opening 15 and the gas is shut off. The casing 8 opposite the boss 12 is provided with a boss 18 in which is screwed a housing 19 having a reduced outer end 20 into which extends the outer end of the valve 15. This valve is free to move longitudinally within the portion 20 and surrounding the valve within the housing 19 is a spring 21 which has its inner end bearing against a cotter-pin 22 carried by the valve. As will be seen from this, the normal tendency of the spring 21 is to hold the valve 15 to the left in a closed position so that the gas is cut off from the burner.

Within the copper tube 6 is a porcelain rod 23 which has its inner end rigidly secured to the tube and extends outwardly within the casing 8 and has a wedge-shaped outer end entering a correspondingly shaped groove 24 in the thermostatic lever 25. The lower end of this lever has an opening 26 through which the valve 15 extends and the cotter-pin 22 bears against this lever caused by the pressure of the spring 21. The side of the housing 8 opposite the copper tube 6 is provided with a boss 27 and through which is screwed the threaded member 28 having at its inner end a reduced portion 29 loosely fitting within a recess in the member 30. The member 30 has its inner end V-shaped and fitting a V-shaped groove 31 in the upper end of the thermostatic lever 25, and this member 30 forms a fulcrum point for the thermostatic lever, as will be later described.

The outer end of the screw-threaded member 28 is provided with a reduced portion 32, upon which is secured the hand wheel 33 by means of a set screw 34. The turning of the hand-wheel 33, as will be readily seen, moves the member 30 inwardly or outwardly, and thus changes the fulcrum point of the thermostatic lever 25 for governing the temperature of the oven.

The inner face of the hand-wheel 33 is provided with a series of notches 35 into which is adapted to pass a spring pressed lock 36. This lock is supported within a recess 37 formed in the upper face of the boss 27, as clearly shown in Fig. 2 of the drawings. The outer periphery 38 of the hand wheel 33 opposite the notches 35 is provided with numbers to indicate the different degrees of temperatures and thus it will be seen that when the hand-wheel is brought in a position so that the lock 36 will enter the notch opposite a certain numeral, the oven will at all times maintain the temperature designated by said numeral.

From the foregoing description, it will be seen that when the oven is heated to a certain degree of temperature, the copper tube 6 expands, carrying with it the porcelain rod 23, drawing the inner end of the porcelain rod away from the thermostatic lever 25 and allowing the spring 21 to force the valve 15 and the lever 25 to the left and shutting off or reducing the amount of gas passing to the burner, and the oven has thus reduced to the proper temperature. The contraction of the copper tube 6 forces the porcelain rod 23 to the right, forcing the thermostatic lever 25 to the left, carrying with it the valve 15 and allowing more gas to pass from the nipple 14 to the burner. The member 30, as will be readily seen, forms the fulcrum for the thermostatic lever 25 and by turning the hand-wheel 33, it will be seen that the fulcrum point changes, thus allowing more or less gas to pass to the burner as the case may be.

Having thus fully described my invention what I claim and desire to secure by Letters Patent is:

1. The combination with an oven, of an elongated combined thermostat and gas supply housing arranged vertically outside of and adjacent and parallel the wall of the oven, the lower end of the housing having a gas burner communication extending within the oven, a gas valve for the gas communication, a vertically arranged thermostatic lever within the housing and operatively connected with the gas valve, a fulcrum for the lever at the upper end of the housing, and a thermostatic extension at the upper end of the housing projecting from the same side of the housing as the gas communication and into the upper portion of the oven and adapted to actuate the thermostatic lever for controlling the gas valve.

2. The combination with an oven of an elongated combined thermostat and gas supply housing vertically arranged outside of the oven and of a length approximately equal to the height of the oven, the lower end of the housing having a gas burner communication extending into the bottom of the oven and a thermostatic extension projecting from the same side of the housing as the gas communication and into the upper portion of the oven, a valve for the gas communication, a thermostatic lever within the housing with its lower end connected to the gas valve and extending upward and engaged by and actuated by the thermostatic extension, and an adjustable fulcrum for the said lever.

3. The combination with an oven of a combined gas supply and thermostatic housing vertically arranged outside of and adjacent and parallel to the wall of the oven, the lower end of the housing having a gas burner communication with the lower end of the oven and the upper end of the housing having a thermostatic extension projecting from the same side of the housing as the gas communication and into the oven, a valve controlling the gas communication, a thermostatic lever within the housing and having its lower end operatively connected with the gas valve and its inner side engaged and actuated by the thermostatic extension, and an adjustable fulcrum engaging the opposite side of the lever at a point nearer its upper end than the point of engagement therewith of the thermostatic extension.

In testimony whereof I hereunto affix my signature in the presence of two witnesses.

BENJAMIN EDWARD MEACHAM.

Witnesses:
C. E. VAN DEUSEN,
WM. YOUNG.